SWITCHING ARRANGEMENTS FOR ANNOUNCING SYSTEMS

Filed Aug. 26, 1960 5 Sheets-Sheet 1

INVENTORS
Louis G. MacKenzie
Leonard F Crabtree
Paul A. Cooper
BY C. A. Gulbrandsen
Atty.

INVENTORS
Louis G. MacKenzie
Leonard F. Crabtree
Paul A. Cooper
BY
C. A. Gulbrandsen
Atty.

SWITCHING ARRANGEMENTS FOR ANNOUNCING SYSTEMS

Filed Aug. 26, 1960 5 Sheets-Sheet 3

INVENTORS
Louis G. MacKenzie
Leonard F. Crabtree
Paul A Cooper
BY
C. A. Gulbransen
Atty.

SWITCHING ARRANGEMENTS FOR ANNOUNCING SYSTEMS

INVENTORS
Louis G. MacKenzie
Leonard F. Crabtree
Paul A. Cooper
BY C. A. Gulbrandsen
Atty.

Jan. 7, 1964 L. G. MacKENZIE ETAL 3,117,184

SWITCHING ARRANGEMENTS FOR ANNOUNCING SYSTEMS

Filed Aug. 26, 1960 5 Sheets-Sheet 5

INVENTORS
Louis G. MacKenzie
Leonard F. Crabtree
Paul A Cooper
BY
C. A. Gulbrandsen
Atty.

United States Patent Office 3,117,184

Patented Jan. 7, 1964

3,117,184

SWITCHING ARRANGEMENTS FOR ANNOUNCING SYSTEMS

Louis G. MacKenzie, Los Angeles, Calif., and Leonard F. Crabtree, Downers Grove, and Paul A. Cooper, Chicago, Ill., assignors to Automatic Electric Laboratories, Inc., Northlake, Ill., a corporation of Delaware, and MacKenzie Electronics, Inc., Inglewood, Calif., a corporation of California Filed Aug. 26, 1960, Ser. No. 52,093
22 Claims. (Cl. 179—6)

This invention relates to announcing systems, and more particularly, the invention relates to switching arrangements applicable for use with announcing systems of the type wherein a complete message is formed from individual words and phrases that are separately pre-recorded, in each of a plurality of recording elements. This "synthesization" is a very efficient modus operandi because it allows a few dozen words and phrases to be combined into several thousand useful message combinations.

It is the usual practice in airline terminals, bus terminals and railway terminals for the operator or attendant on duty to announce arrivals and departures of the various flights, buses or trains. Each operator inherently has a different speech characteristic, some of which make understanding difficult. It has been found that a larger percentage of passengers than necessary have missed their connections because they did not or could not understand the announcements. In addition, many of these announcements are interrupted by other operators cutting in on them before the complete message is announced. The dial-access announcing system of this invention employs the above mentioned synthesizing technique to overcome these prior difficulties.

It is the principal object of this invention to provide a novel and improved calling-device accessed switching arrangement whereby a plurality of individual stations may automatically select the individual recording elements containing the pre-recorded words or phrases to be combined to form a single message.

It is a further object of this invention to provide means for general paging in an announcing system of the type described above. In this connection it is a still further object of this invention to provide means for guarding against power failures in the system.

A principal feature of this invention is a provision of a decoder which is common to the system and which makes it possible to select one out of a large number of recording elements under control of a multi-number code digit dialled by an attendant. For example, in the disclosed embodiment the decoder is capable of translating a $3\times10$ number-combination to a one out of $10^3$ number-selection using only four rotary switches.

A further feature of the system is a provision of a unique marking and stopping circuit for the high-speed rotary switches in the decoder unit. The stopping circuit extends over a loop circuit which includes the wipers and bank contacts of the decoder switches, the switches in the message selectors and the scanner-selector switch and does not operate to stop the stepping of the wipers of the decoder switches till coincidence is obtained between the settings of all of the switches. The action is positive and results in errorless decoding since coincidence must be obtained, otherwise the wipers are continually stepped till the desired coincidence is found on all of the switches.

A further feature of the system is a provision of a holding circuit in the message selectors whereby the operator may dial the necessary information and then hang up the telephone handset. The message selector stores the information until it is serviced by the scanner controller; thus, in effect it functions as a temporary memory for the system.

A still further feature of the system is the way in which the sequence of operation is controlled by means of a signal received from the individual recording elements. The operation is unique in that the information injected on dialling the first digit is not the first to be released, that is, is not the first to be transmitted. This information is stored temporarily until after a predetermined announcement has been made and then it is released to trigger the recording element containing the corresponding information. In addition, if it is a final call a further final call announcement is transmitted after the complete sequence of operation and before the equipment automatically releases. Provisions are also incorporated to automatically include an individual element, or "segment," of the announcement in the sequence of operation without the necessity of dialling. For instance, in the disclosed embodiment the particular element containing the gate number from where the call has originated is automatically selected by means identifying the call originating message selector. Furthermore, while one or more of the recording elements are selected under control of the decoder, one or more of the recording elements are selected under control of the message selector directly.

It is a still further feature of the system to incorporate means whereby the system may still be used if there is a power failure in the switching system. If a power failure does result the operator sets a selector switch to disconnect his telephone substation from the message selector and to connect it to a regular telephone line to a central office or a PABX installation, and then dials "0." By a suitable "jumpering" of the bank contacts of a ground-forwarding switch in the central office or PABX installation a ground is extended to operate the amplifier "turn on" relay to energize the amplifiers of the system; the attendant may then proceed with his announcement by means of the transmitter of the telephone handset.

The invention, both as to its organization and method of operation, together with other objects and features not specifically mentioned, will best be understood by reference to the following specification taken in connection with the accompanying drawings.

In these drawings:

FIG. 1 is a schematic circuit diagram of the scanner-controller.

FIG. 2 also shows part of the scanner-controller, as well as part of the message selector.

FIGS. 1–5 when aligned as shown in FIG. 6 represents the invention as it is embodied in an airport announcing system.

*General Description*

Figure 2:
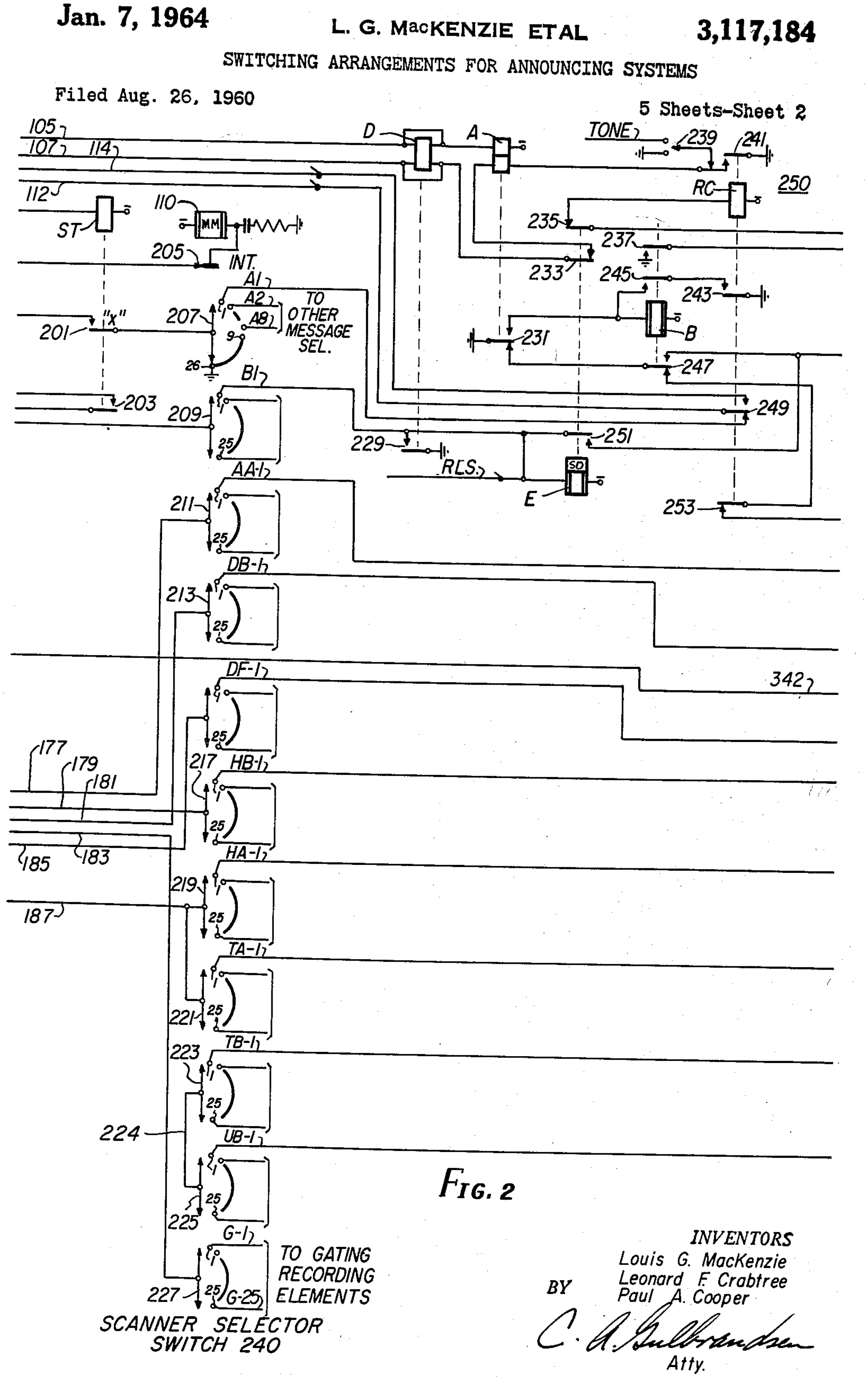
Figures 3, 6:
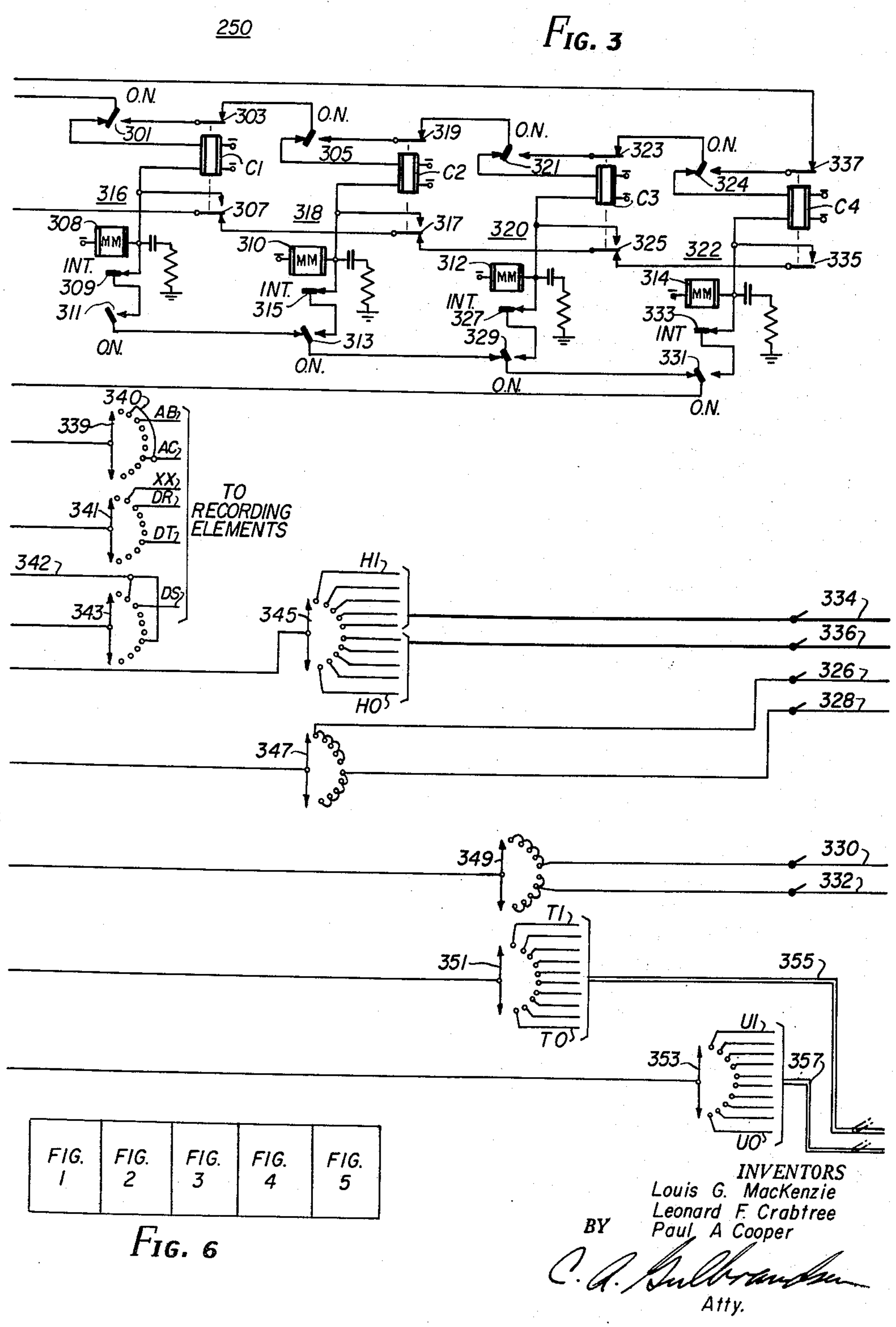
FIG. 3 is a schematic circuit diagram of the message-selector.
FIG. 6 shows the alignment of FIGS. 1–5, inclusive.
Figure 4:
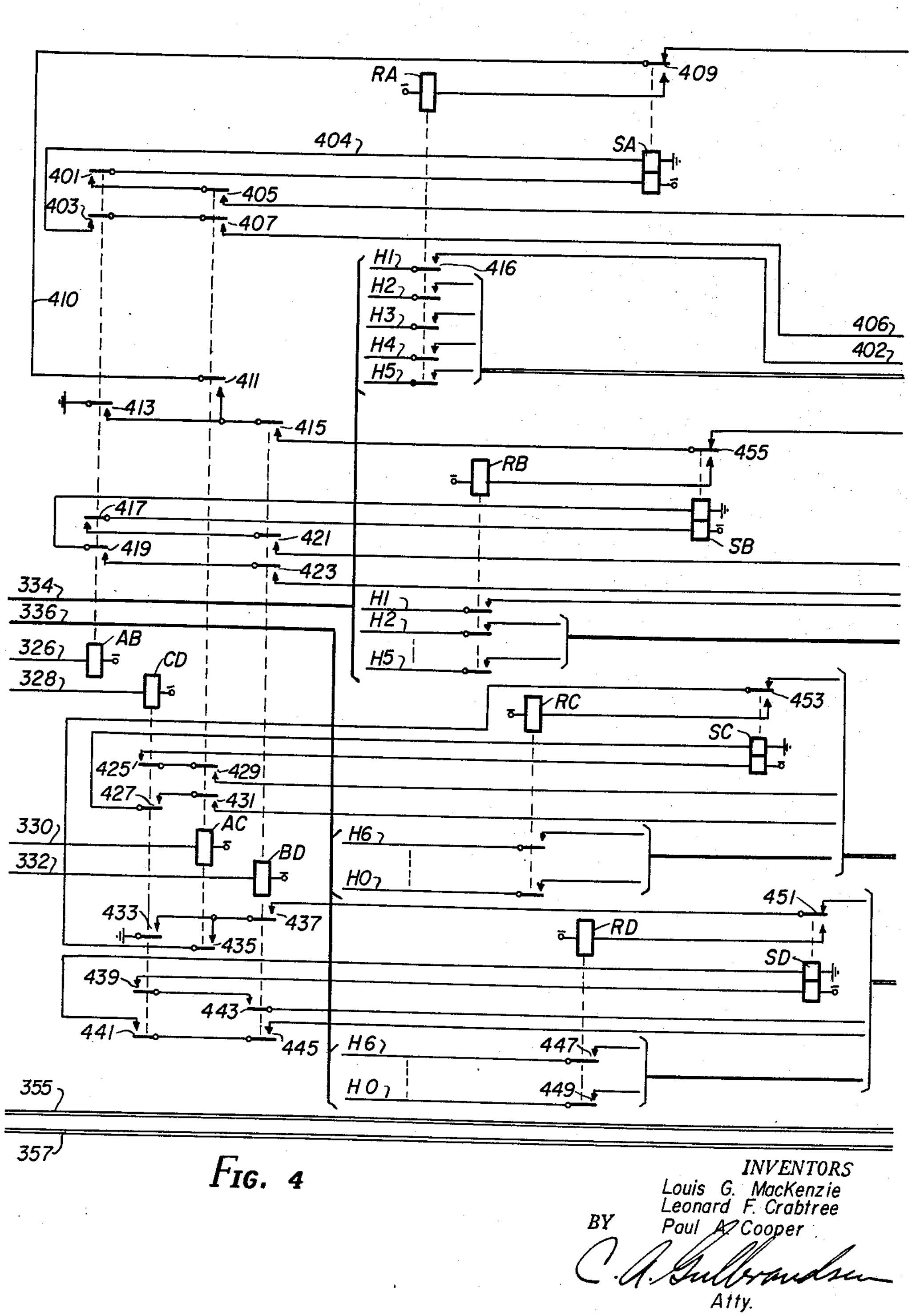
FIGS. 4–5 is a schematic circuit diagram of the decoder.
Figure 5:
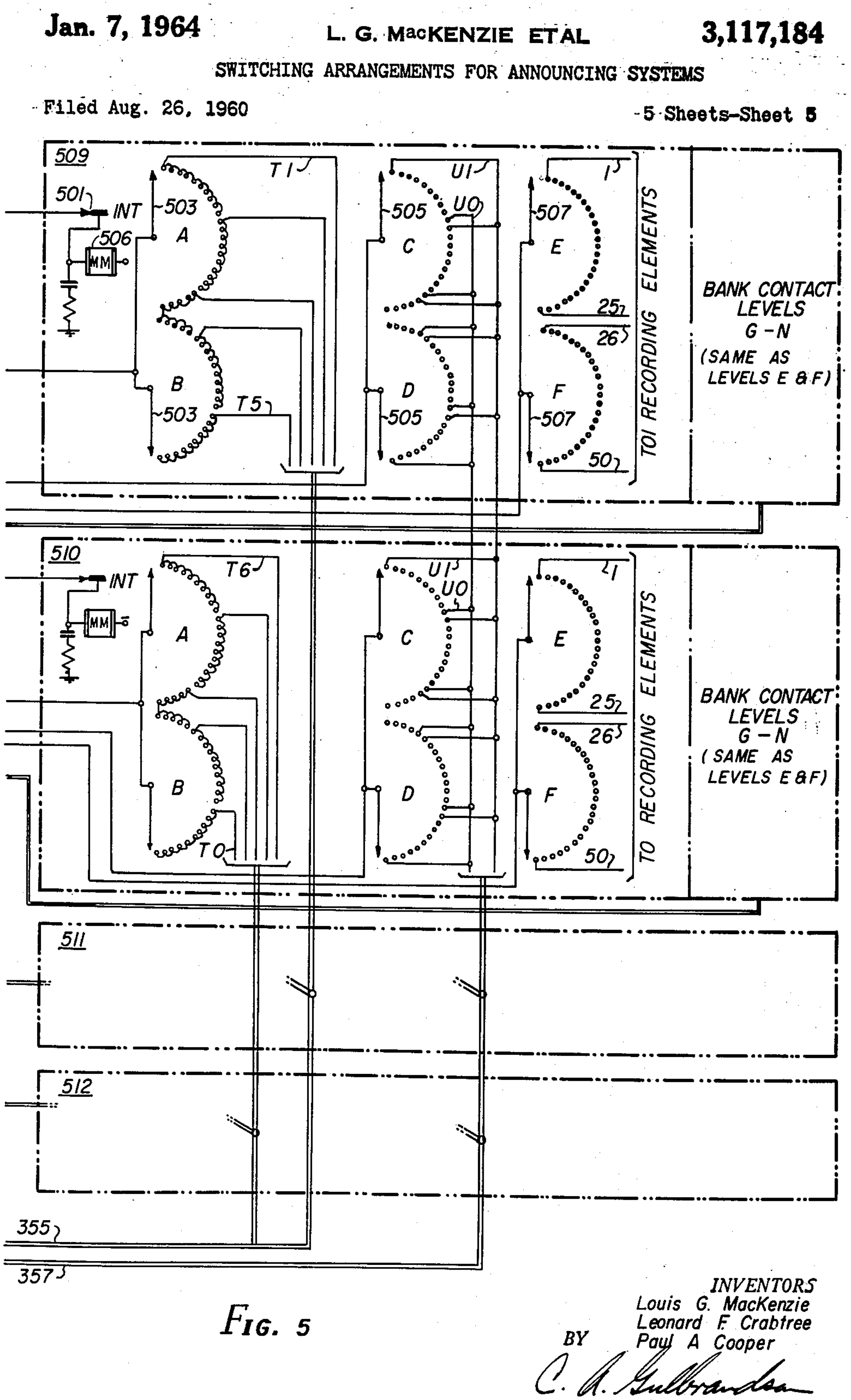

Referring now to the drawings. The dial-access switching arrangement is disclosed by this embodiment as it is incorporated into an airport announcing system. It is to be understood, however, that the invention is not limited to this environment and may be incorporated into any announcing system employing this technique. The system as disclosed comprises a series of telephone substations each of which may be connected by means of a switch to either a message selector associated with the telephone substation or to a regular telephone line. Only one such telephone substation 101 (FIG. 1), switch 103 (FIG. 1) and message selector 250 (FIGS. 2 and 3) is shown for clarity, however it is to be understood that any number of telephone substations and associated message selectors may be used. The system further comprises a scanner-controller (FIGS. 1 and 2) including a sequence scanner switch 120 (FIG. 1) and a scanner-selector switch 240 (FIG. 2) which sequentially scans and locks-in activated message selectors and converts the information stored therein into the proper series of switching operations that will successively energize the desired solenoids in the recording elements that contain the pre-recorded message segments to produce a complete message; and a decoder (FIGS. 4 and 5) which is common to the system and which translates or decodes the dialed digits to select the desired recording elements containing the message segments.

The audio output of the recording elements (not shown) is bridged by an end of message unit (not shown) which recognizes the end of each message segment and closes a contact to extend a ground pulse to the scanner-controller (FIGS. 1 and 2) causing it to advance to the next message segment. The tapes in the recording elements continue to play until the cue-up at the beginning of the message segments. This point on the tapes is identified by a photo-cell (one for each tape channel) which receives a pulse of light from a reflective foil marker placed on the tape. The photo-cell pulse, properly amplified, releases the corresponding solenoid to stop the recording element. The design of the end-of-message identifying arrangement does not form a part of the present arrangement, therefore the details of this technique have not been shown in the present disclosure.

To activate the system, the flight attendant sets selector switch 103 (FIG. 1) to connect the telephone substation 101 to its associated message selector 250 (FIG. 2), lifts the handset (not shown), dials a first digit to indicate whether the flight is "now arriving," "now boarding" or "now departing," and then the three digits of the flight number. On completion of dialling the message proceeds automatically. The flight attendant can hang-up the handset if he so desires without effect on the operation at this time. The fact that he is dialling from a particular telephone substation, and has his own message selector, allows the gate identifying portion of the message to be automatically inserted without further dialling.

During any time interval when the announcing system is idle, i.e., during any time interval when no announcement is being made, any flight attendant making a general announcement sets selector switch 103 (FIG. 1) to disconnect his telephone substation 101 from message selector 250 and to connect the telephone substation 101 to a regular telephone line 109 available for normal operation of the telephone, lifts the handset (not shown) and then dials "0." On completion of dialling the flight attendant listens to hear whether or not a high frequency tone (a peep) is present and if not he proceeds with his general announcement by speaking into the transmitter of the telephone handset as when making a regular telephone call. The high frequency tone is to indicate that the announcing system is in use.

Figure 1:
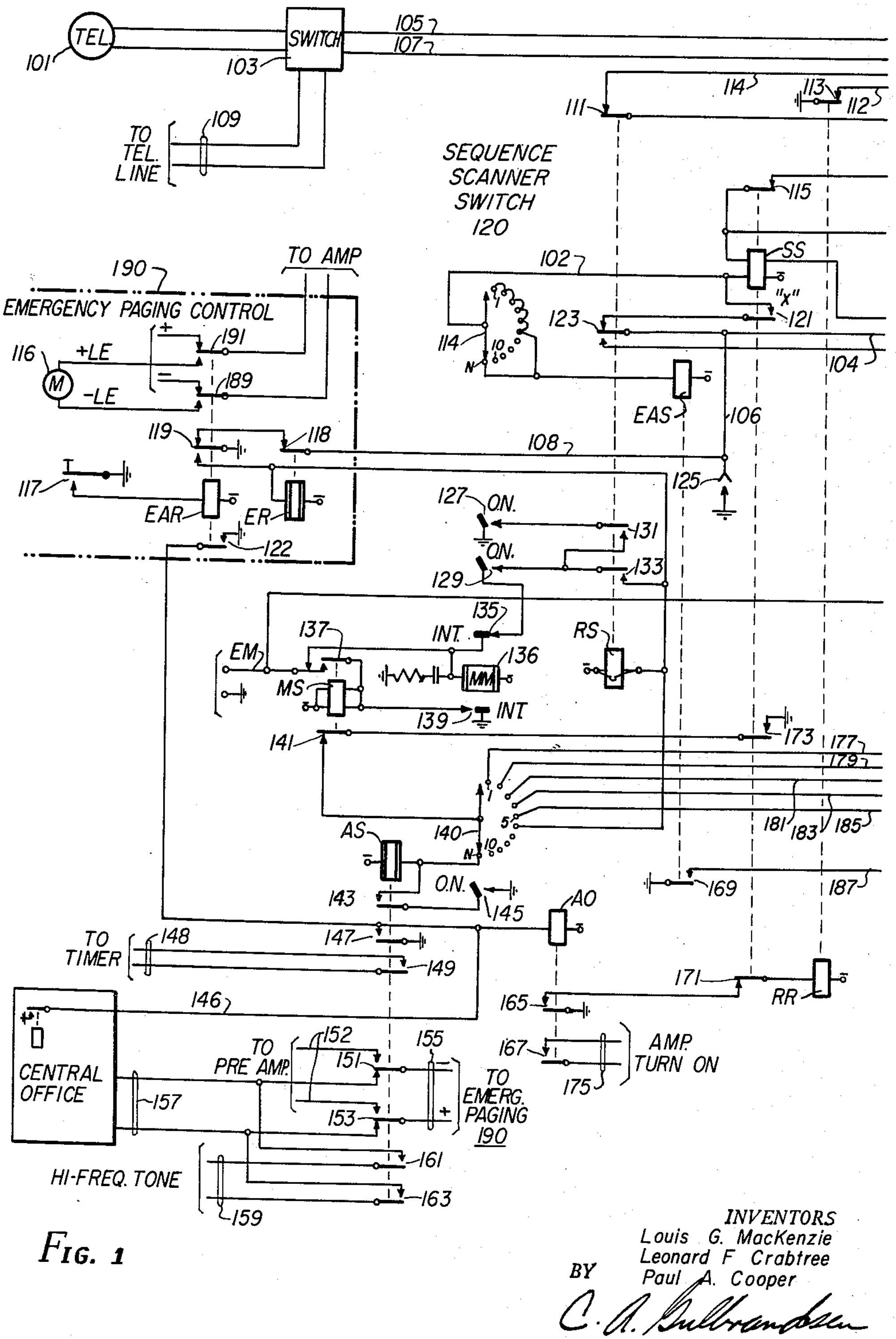

On an emergency announcement the flight attendant depresses push-button 117 (FIG. 1) which automatically terminates any announcement which may be in progress. He then transmits his emergency announcement by means of microphone 116 (FIG. 1).

DETAIL DESCRIPTION

*Departure Announcement*

Assume, for the purpose of explaining the detailed operation of the system, that the operator at one of the gates desires to announce the departure of airline flight number 421. The operator sets switch 103 to gain access to message selector 250 (FIGS. 2 and 3) associated with telephone substation 101 (FIG. 1). On lifting the handset (not shown) a line loop is completed to operate pulsing relay A; this may be traced as follows: battery, upper winding of relay A, conductor 105 to the switch 103 and telephone 101 to conductor 107, break contact 233, lower winding of relay A, make-before -break contact 241, to ground. Differential relay D is provided to release the message selector if the operator wishes to cancel the announcement after he has completed dialling (by removing the straps on relay D and grounding the lower winding relay D is operated). Relay A on operating closes ground to operate slow-release relay B at make contact 231. Relay B on operating prepares a holding circuit for itself from battery of relay B, make contact 245, make contact 243 on relay RC (not yet operated), to ground. Also, at make contact 237 ground is extended through off-normal spring 301 of motor magnet 308 to operate relay C1 and an operate path is prepared for motor magnet 308 through make contacts 247 and 307 of relay C1 (now operated).

The operator now dials the digit 3 for a "now departing" announcement. On dialling the digit 3, relay A is pulsed when the line loop is opened in the well-known manner by the dial impulse springs (not shown) to extend ground to motor magnet 308 over the above-mentioned path. Relay B being slow-to-release holds up during pulsing. Motor magnet 308 operates to step wipers 339, 341, and 343 to the third bank contact on their respective banks in the well-known manner. On the first step, off-normal springs 301 open to remove ground from slow-release relay C1 which is then held during pulsing by the ground extended through the lower winding. During the inter-digital pause ground is removed from relay C1 and it releases. When relay C1 restores ground is extended through make contact 237 of relay B, off-normal springs 301 of motor magnet 308, break contact 303 of relay C1, off-normal spring 305 of motor magnet 310, upper winding of relay C2 to battery to operate relay C2. Relay C2 on operating closes make contact 317 to prepare an operate path for motor magnet 310.

The operator now dials the flight number 421. On dialling the first digit 4, pulsing relay A is pulsed as before to extend ground to motor magnet 310 to cause it to step wipers 345 and 347 to the fourth bank contact on their respective levels, this may be traced as follows: ground, break contact 231 of relay A, make contact 247 of relay B, break contact 307 of relay C1, make contact 317 of relay C2, through motor magnet 310 to ground. Slow-release relay B again holds up during pulsing. Relay C2 is held through the lower winding, ground being removed from the upper winding as soon as motor magnet 310 steps off-normal at off-normal springs 305. During the interdigital pause relay C2 restores and extends ground to relay C3 which in turn prepares an operate path for motor magnet 312 in the manner described above for motor magnet 310. On dialling the next digit 2 the same operation is subsequently performed to operate motor magnet 312 to step wipers 349 and 351 to bank contact 2 on their respective banks and relay C3 on restoring extends ground through break contact 323 to operate relay C4.

On dialling the last digit 1, relay A is again pulsed and motor magnet 314 causes wiper 353 to step to its first bank contact as previously described. When the dialling is complete relay RC is operated; this may be traced as follows: ground, make contact 237 of relay B, off-normal springs 301, break contact 303, off-normal spring 305, break contact 319, off-normal springs 321, break contact 323, off-normal springs 324, break contact 337, conductor 324, break contact 235 to battery of relay RC. Relay RC on operating extends a holding ground to relay B and relay B locks-up; this may be traced as follows: ground, make-contact 243 of relay RC, make contact 245 of relay B, to battery. Also, at make-before-break contact 241 of relay RC the ground connection holding up relay A is transferred.

It may be noted that when relay RC is operated all of the switches of message selector 250 are held up since relay B is locked-up. The operator may now hang up the telephone and attend to his additional tasks which he must perform and the subsequent announcement will proceed automatically; thus this special hold-up feature provides a temporary memory for the system storing the information to be announced until the message selector 250 associated with telephone substation 101 is serviced.

Before proceeding further with the announcement, the operation of the scanner-controller circuit (FIGS. 1 and 2) will be briefly described.

It may be observed when the message selector 250 associated with telephone substation 101 (the same is true for all of the other message selector units associated with the other telephone substations at each of the other gates) is idle, that is, no message is being stored, ground is extended to the first bank contact of scanner-selector switch 240 to mark this contact or message selector 250 as idle; this may be traced as follows: ground, break contact 113 of relay RR (FIG. 1), conductor 112, break conductor 249, conductor A1, to bank contact 1 of the scanner-selector switch 240. Scanner-selector switch 240 is of the non-homing type and wiper 207 remains on the bank contact associated with the last message selector which it served. It may be observed that the ground on the bank contacts is not extended to motor magnet 110 of the scanner-selector switch 240 to cause it to step until the "X" contact 201 of relay ST is closed; thus motor magnet 110 is not continually stepping in search of a particular message selector requesting service.

Conductor 112 is multipled to all of the available message selectors and if any one, or all, of the message selectors is requesting service relay ST will be operated. This may be shown as follows: when a message selector is storing information relay RC, for example, is operated at break-make contacts 249 of relay RC ground is transferred from conductor A1 to conductor 112, through break contact 111 of relay RS, to battery to operate relay ST.

Assume now that all of the message selectors are idle, the wiper 207 of scanner-selector switch 240 is setting on its tenth contact, and that the flight attendant at telephone substation 101 has just completed dialling the above-mentioned information, and that relay RC has operated. When relay RC operates ground is transferred to conductor 112 by way of break-make contacts 249 of relay RC, over conductor 112, break contact 111 of relay RS to battery of relay ST. Relay ST operates to close "X" contact 201. Since all of the other message selectors were assumed idle wiper 207 of scanner-selector switch 240 will find ground to operate motor magnet 110 causing it to step to the next contact. If it finds another ground on this contact it will step again and continue to step until finding the contact requesting service. This may be traced as follows: ground on any bank contact associated with an idle message selector, "X" contact 201 of relay ST (now operated), break contact 115 of relay SS, interrupter contact 205 of motor magnet 110, to battery of motor magnet 110.

Relay ST now operates fully to close make contact 203 which in turn causes relay SS to operate its "X" contact 121, and on the closing of "X" contact 121 to operate fully; this may be traced as follows: battery of motor magnet 110, interrupter contact 205, break contact 115, upper winding of relay SS, make contact 203, conductors 104, 106 and 108, break contacts 118 and 119, to ground to cause "X" contact 121 to close. When "X" contact 121 closes relay SS operates fully and locks-up over the following path: battery of relay SS, "X" contact 121 of relay SS, break contact 123, conductors 104, 106 and 108, break contacts 118 and 119, to ground.

It may be observed that when relay ST operated fully the lower winding of relay SS and the motor magnet 110 were in series. Motor magnet 110 did not or will not step again, however, because of the high resistance of the lower winding of relay SS. It may also be noted that relay SS would be shunted out and would not operate its "X" contact 121 if wiper 207 of scanner-selector switch 240 had found ground on stepping to the next contact, this may be traced from the bank contact associated with an idle message selector to ground as previously described. Motor magnet 110 would have then stepped to the next following contact.

When "X" contact 121 of relay SS operates ground is also extended to relay EAS causing it to operate; this is as follows: ground, break contacts 119 and 118, conductors 108, 106 and 104, break contact 123, "X" contact 121 of relay SS, conductor 102, wiper 114 of sequence scanner switch 120, bank contact 10, to battery of relay EAS.

Relay SS in operating fully extends, ground through make contact 173, break contact 141, to the wiper 140 of the sequence scanner switch 120. It may be observed that the sequence scanner switch 120 is of the homing type and wiper 140 homes on the last, or homing, bank contact. When ground is extended to wiper 140 of sequence scanner switch 120 relay AS operates to close contacts 143, 147, 151, 153, 161 and 163; the subsequent result of closing these contacts initiates the operation of the announcing system as follows: at make contact 143 a lock-up path is prepared for relay AS through off-normal springs 145 to ground; at make contact 147 ground is extended to operate relay AO, the operation of which will be explained later; at make contact 149 a loop circuit is completed to energize the timer circuit (not shown) of the recording elements by way of conductors 148; the timer circuit when energized introduces a 20 second delay which is sufficient for the decoding operation to be completely performed as well as any other operation which must be performed prior to the initial announcement; at make contacts 151 and 153 a loop circuit is completed from the output of the pre-amplifiers (not shown) of the recording elements by way of conductors 152 to the input of the main amplifiers (not shown) by way of conductors 155, the output of the recording elements being pre-amplified and then again amplified before being impressed on the system's loudspeakers (not shown); at make contacts 161 and 163 a high-frequency tone is extended by way of conductors 159; the purpose of this tone will be explained later.

Referring now to relay AO which operated when make contact 147 closed. Relay AO on operating closes make contact 165 to extend a ground which has no effect at this time since relay SS is operated to open break contact 171, and at make contact 167 a loop circuit is completed over conductors 175 to energize the main amplifiers previously mentioned.

Relay EAS in operating initiates the decoding operation which is preferably performed at this time (during the 20 second delay introduced by the timer) to eliminate any unnecessary delay during the announcement, that is, during the intervals between the various segments of the message.

The decoder which is common to the system (FIGS. 4 and 5) comprises only 4 rotary switches 509–512 which may be the type disclosed by Graybill et al. in U.S. Patent 2,522,715, issued September 19, 1950. The operation of the decoder is described with relation to the message selector 250 however its operation is the same when any of the other message selectors are being serviced by the decoder. Decoding of the 3-digit flight number to select one output connection of 1000 possible output connections to the recording elements is accomplished, in part, by means of the bank contacts on digit registers 318 and 320 of message selector 250 (not shown). It may be noted that the bank contacts on the second level (as shown) of digit register 318 and the bank contacts on the first level (as shown) of digit register 320 are multipled to form two groups of bank contacts comprising bank contacts 1–5 and bank contacts 6–10, respectively. Relays AB, CD, AC and BD are connected individually to one of these groups and, when operated, served to select one of the decoder switches 509–512. Selection of one of the decoder switches 509–512 is made by operating two of the relays, as shown in the table which follows:

| Relays: | Decoder switch |
|---|---|
| AB and AC | 509 |
| AB and BD | 510 |
| CD and AC | 511 |
| CD and BD | 512 |

Decoder switches 509–512 each have 14 levels of bank contacts with 25 bank contacts on each level; only 6 levels (levels A–F) of the bank contacts of decoder switch 509 and decoder switch 510, respectively, are shown for clarity and are sufficient to explain the operation of the decoder. Decoder switches 511 and 512 are shown in block form and are the same as decoder switches 509 and 510, that is, the bank contacts of decoder switch 511 are tied similarly to the bank contacts of decoder switch 509 and the bank contacts of decoder switch 512 are tied similarly to the bank contacts of decoder switch 510. The bank contacts on levels E and F, as well as all of the bank contacts on the levels not shown, on all of the decoder switches are individually designated from 000–999 and are individually connected to a pre-determined one of the recording elements.

It may be observed that the bank contacts on levels A and B of decoder switches 509 and 510 (as well as the bank contacts on levels A and B of decoder switches 511 and 512) are tied in 10 groups of 10 bank contacts per group with each group tied to one of the conductors T1–T0, respectively. The bank contacts on levels C and D of decoder switches 509 and 510 (as well as decoder switches 511 and 512) are sequentially connected, individually, to one of the conductors U1–U0. This arrangement is such that when wiper pairs 503 and 505 are stepped, wiper pair 505 steps over 10 bank contacts while wiper pair 503 steps over 1 bank contact (actually 10 bank contacts multiplied to form 1 bank contact).

Referring now to the description of the announcement, the decoding operation takes place as follows: wipers 347 and 349 of digit register 318 and 320, respectively, were stepped to select relays AB and AC. Relays EAS in operating closes make contact 169 to extend a ground to operate relays AB and AC; this may be traced as follows: ground, make contact 169, conductor 187, wipers 219 and 221 of the scanner selector switch 240, bank contact 1 on their respective levels, conductors HA–1 and TA–1, wipers 347 and 349 of digit registers 318 and 320, bank contact 4 of digit register 318, and bank contact 2 of digit register 320, to conductors 326 and 330, respectively, to battery of relays AB and AC causing them to operate.

Relays AB and AC in operating close make contacts 413 and 411 to extend ground to energize motor magnet 506; this may be traced as follows: ground, make contacts 413 and 411, conductor 410, break contact 409 of relay SA, interrupter contact 509, to battery of motor magnet 506. Motor magnet 506 operates to step the wipers of decoder switch 509 and interrupts itself each time it steps, at interrupter contact 501. Relays AB and AC in operating also close make contacts 401, 403, 405 and 407 to prepare a stopping circuit for the decoder switch 509; this may be traced as follows: battery on relay SA, make contact 401 of relay AB, make contact 405 of relay AC, wiper pair 503 of decoder switch 509, bank contacts of either level A or B of decoder switch 509, conductors cable 355, bank contact 2 of digit register 320, wiper 351, conductor TB–1 to bank contact 1 of scanner-selector switch 240, wiper 223, jumper cable 224 to the wiper 225, bank contact 1 of scanner switch 240, conductor UB–1, wiper 353 of digit register 322, bank contact 1 of digit register 322, conductor cable 357 to the bank contacts of either level C or D of decoder switch 509, wiper pair 505 of decoder switch 509, conductor 406, make contact 407 of relay AC, make contact 403 of relay AB, conductor 404 through the lower winding of relay SA to ground; relay SA will only operate when coincidence is obtained on all of the above switches, that is, wiper pairs 503 and 505 (as well as the rest of the wipers on the switch) continue to step until the above-described path is completed to operate relay SA which in turn de-energizes motor magnet 506.

At the end of the 20 second delay introduced by the timer, the timer extends a false ground on conductor EM to cause the motor magnet 136 of sequence scanner switch 120 to step wiper 140 to the first bank contact.

When wiper 140 of sequence scanner switch 120 steps to the first bank contact ground is extended to energize a solenoid of the recording element containing the initial segment of the message announcement causing it to operate and start the announcement. This may be traced as follows: ground, make contact 173 of relay SS, break contact 141 of relay MS, wiper 140 and the first bank contact of sequence scanner switch 120, conductor 177, wiper 211 and the first bank contact of scanner-selector switch 240, conductor AA–1, wiper 339 and the third bank contact of digit register 316, conductor AB, to the solenoid of the recording element. The output of the recording element is impressed on the pre-amplifier, over conductors 152, through make contacts 151 and 153, over conductors 155, to the main amplifiers, and then transmitted by means of the systems loudspeaker. At the end of the message segment a sub-audible tone which is superimposed on the audio portion of the message segment ceases and an end of message unit (not shown) detects the absence of this tone and causes a ground pulse to appear on conductor EM. The recording element continues to run until a photo-cell detects a light beam reflected from a reflective foil marker placed at the beginning of the message segment. The signal output of the photo-cell, properly amplified, causes the solenoid, which was previously energized to start the recording element, to drop out and stop the running of it.

The ground pulse from the end of message unit is extended by way of conductor EM, make-before-break contacts 137, to battery of motor magnet 136 to cause it to operate and step wiper 140 of sequence scanner switch 120 to the second bank contact. When motor magnet 136 operates contact 139 closes to extend ground to relay MS causing it to operate. Relay MS in operating interrupts motor magnet 136 by removing the ground on conductor EM at make-before-break contacts 137.

Sequence scanner switch 120 in stepping to the second bank contact extends a ground to energize the solenoid of the recording element containing the flight number stored by digit register 318, 320 and 322 of message selector 250. This may be traced as follows: ground, make contact 173 of relay SS, break contact 141 of relay MS, wiper 140 of sequence scanner switch 120, bank contact 2 of sequence scanner switch 120, conductor 179, wiper 217 of scanner-selector switch 240, bank contact 1 of scanner-selector switch 240, conductor HB–1, wiper 345 of digit register 318, bank contact 4 of digit register 318, conductor cable 334, make contact 416 of relay RA, conductor 402, to wiper pair 507 of decoder switch 509 and from the bank contacts on level E or F of decoder switch 509 to the solenoid of the recording element containing the flight number previously dialled by the operator. Thus it may be observed that the level to which the desired recording element is connected is selected after the initial selection of the decoder switch, that is, initially, one of the decoder switches is selected and then the particular level on that switch to which the desired recording element is connected is selected. It may be noted that relay RA operated when relay SA operated; this may be traced as follows: ground, make contact 413 of relay AB, make contact 411 of relay AC, conductor 410, make contact of the break-make contacts 409 of relay SA to battery of relay RA. Relay SA, in addition, opened the path whereby ground was extended to operate motor magnet 506 of decoder switch 509 at break-make contacts 409 of relay SA.

Again as previously described, the ground pulse from the end of message unit is extended on conductor EM to cause motor magnet 136 of the sequence scanner switch 120 to operate and step wiper 140 to the third bank contact. When wiper 140 of sequence scanner switch 120 steps to the third bank contact ground is again extended to energize the solenoid of the recording element associated with the recording element containing the next segment, that is, the "now departing" segment of the announcement. This may be traced as follows: ground, make contact 173 of relay SS, break contact 141 of relay MS, wiper 140 of sequence scanner switch 120, bank contact 3 of sequence scanner switch 120, conductor 181, wiper 213 of scanner-selector switch 240, bank contact 1 of scanner-selector switch 240, conductor DB–1, wiper 341 of digit register 316, bank contact 3 of digit register 316, and by way of conductor DR to the solenoid of the recording element causing it to operate and start the announcement. At the end of the announcement motor magnet 136 of sequence scanner switch 120 is again caused to operate by the ground pulse on conductor EM from the end of message unit, and wiper 140 of sequence scanner switch 120 is stepped to the fourth bank contact.

It may be observed that at this time the gate number, which was not dialled, associated with the telephone substation 101 and the message selector 250 is now automatically included in the message announcement. This may be traced as follows: ground, make contact 173 of relay SS, break contact 141 of relay MS, wiper 140 of sequence scanner switch 120, bank contact 4 of sequence scanner switch 120, conductor 183, wiper 227 of scanner-selector switch 240, bank contact 1 of scanner-selector switch 240, and by way of conductor G–1 to operate the solenoid of the recording element containing the gate number segment of the message. After transmitting the gate number motor magnet 136 of sequence scanner switch 120 is again operated in the manner previously described by the ground pulse from the end of message unit causing wiper 140 of sequence scanner switch 120 to step to the fifth bank contact. It may now be noted that a further feature incorporated in this announcing system is that on a "now departing" announcement that the sequence of operation is such that after the gate number has been announced a "final departure" call is then automatically transmitted. This is as follows: when wiper 140 of sequence scanner switch 120 steps to the fifth bank contact ground is extended to operate the solenoid associated with the recording element containing a "final departure" announcement by way of conductor DT; this may be traced as follows: ground, make contact 173 of relay SS, break contact 141 of relay MS, wiper 140 and bank contact 5 of sequence scanner switch 120, conductor 185, wiper 215 and bank contact 1 of scanner-selector switch 240, and by way of conductor DF–1 to the solenoid of the recording element causing it to operate. At the end of this segment motor magnet 136 of the sequence scanner switch 120 is again caused to step wiper 140 of sequence scanner switch 120 to the sixth bank contact, in the manner previously described.

It may be observed that the system as disclosed uses only the first five bank contacts of the sequence scanner switch 120, thus provisions are provided for expanding the operation of the announcing system through the use of the remaining bank contacts on the sequence scanner switch 120. The system as shown and described however is arranged such that when wiper 140 of sequence scanner switch 120 steps to the sixth bank contact relay RS is operated to cause the motor magnet 136 of sequence scanner switch 120 to step to its homing position, that is, to its last, or homing bank contact; this may be traced as follows: ground, make contact 173 of relay SS, break contact 141 of relay MS, wiper 140 of sequence scanner switch 120, bank contact 6 of sequence scanner switch 120, conductor 193, to the battery of relay RS. Relay RS in operating extends ground through off-normal springs 127, make contact 131, off-normal springs 129 and interrupter contact 135 to motor magnet 136 causing it to operate. It may also be noted that relay RS in operating is locked-up by means of the ground extended through off-normal spring 127 of motor magnet 136, make contacts 131 and 133 of relay RS, to battery of relay RS. Motor magnet 136 continues to operate and interrupt itself through interrupter contact 135 until reaching the last or its homing bank contact at which time its off-normal contacts 127 and 129 open to restore relay RS.

Furthermore, it may be noted that relay RS in operating causes relay SS and relay EAS to restore since the break contact of break-make contacts 123 or relay RS is opened removing the holding ground for relays SS and EAS. Simultaneously at the make contact of break-make contacts 123 of relay RS ground is extended through break contacts 119 and 118, conductors 108, 106 and 104, make contact 123, wiper 209 of scanner-selector switch 240, bank contact 1 of scanner switch 240, conductor B–1, to battery of slow-to-operate relay E causing relay E to operate. Relay E in operating at break contacts 235 opens the holding ground on relay RC causing relay RC to restore which in turn at make contact 243 removes the holding ground from slow-release relay B thus restoring relay B. Relay B on restoring releases digit registers 316, 318, 320 and 322 and they restore to normal.

*Arrival Announcement*

To announce the arrival of an airline flight the operator at telephone substation 101 sets selector switch 103, removes the handset (not shown), and dials a first digit to indicate the flight is "now arriving" and then the three digits of the flight number as when making a departure announcement. For an arrival announcement, however, the operator dials a digit 2 rather than a digit 3 which indicates a departing flight. On dialing the digit 2 wipers 339, 341 and 343 of digit register 316 of message selector 250 are stepped in response to the dial impulses to the second bank contact in the manner previously described. The operator then dials the three digits of the flight number and the wipers of digit registers 318, 320 and 322 are stepped accordingly to the corresponding bank contacts of the respective registers. On completion of dialling relay RC operates as previously described and the operator may replace the handset, the dial digits being stored as before.

When relay RC operates ground is again removed from the first bank contact of scanner-selector switch 240 associated with message selector 250 at break contact 249; and at make contact 249 extended by way of conductor 114, break contact 111, to relay ST causing it to operate. Wiper 207 of scanner-selector switch 240 steps in search of the message selector requesting service in the manner previously described, and on finding the first bank contact the "X" contact 121 of relay SS again operates to extend ground to operate relay SS fully. On "X" contact 121 closing relay EAS is also operated to close make contact 169 which starts the decoding operation previously described. Simultaneously, when relay SS operated ground is extended to operate relay AS which initiates the sequence of operation fully described in the preceding discussion.

It may be observed that when ground is extended to wiper 339 of digit register 316 the same recording element containing the initial segment of the message used for a "now boarding" announcement, which will be subsequently described, is energized, that is, the solenoid associated with this recording element is energized to start the recording element running. If any need occurs to use a different initial segment it is only necessary to remove jumper cable 340 and to add an additional recording element containing the message segment desired.

It may also be recalled that when ground was extended to wiper 343 of digit register 316 on a departure announcement the ground was extended by means of the third bank contact and conductor DS to the solenoid of a recording element containing a "final departure" announcement, which is then transmitted in addition to the first "departure" announcement. On an arrival announcement, however, it is not essential that a final announcement be made since there is no danger of a passenger missing his airline flight. The second bank contact, as well as the seventh, of digit register 316 is therefore arranged to extend ground from wiper 343 over conductor 342, make-before-break contact 137, to battery of motor magnet 136 to cause it to operate and step wiper 140 of sequence scanner switch 120 to the next bank contact. Relay RS then operates to cause motor magnet 136 to operate and step wiper 140 of sequence scanner switch 120 to its homing position, and to restore relays ST, SS and EAS, as well as the digit registers of message selector 250, in the manner previously described.

*Now Boarding Announcements*

To announce the "now boarding" of an airline flight the operator follows the same steps as previously discussed when making either a departure or arrival announcement only he dials the digit 7 instead of the digit 3 or 2 for the above announcements, respectively. The operation of the system is as it is described above except for the "now boarding" announcement which is included in the message rather than the announcements previously mentioned when ground is extended to the wiper 341 of digit register 316 during the sequence of operation outlined in the preceding discussions.

*General Paging Announcement*

The flight attendant at telephone substation 101, for example, first sets selector switch 103 to disconnect his substation 101 from its associated message selector 250 and to connect it to the telephone line 109 which extends to the central office or PABX installation, removes the handset (not shown) to complete a circuit to a ground-forwarding selector (shown simply as a relay having a ground forwarding contact) in the central office or PABX installation in the manner well-known in the telephone art, and dials "0" whereon the selector steps accordingly to seize the terminals of incoming conductors 157 and to extend ground from the control lead of the selector to conductor 146 to operate relay AO. Relay AO in operating closes make contact 165 to energize the main amplifiers in the manner previously described. The flight attendant then listens, using the receiver of the telephone handset, to determine whether or not a high-frequency tone (a peep tone) is present, and if not present he may transmit his general announcement by means of the transmitter of telephone handset, over conductors 157, break contacts 151 and 153, conductors 155, to the main amplifiers (not shown) to the loudspeakers of the system. It may be recalled that the high-frequency tone was previously applied to conductors 157 when relay AS operated under normal operating conditions. This tone therefore serves to warn the flight attendant desiring to make a general announcement that the system is presently being used. He may then either hang-up the handset and try again, or he may wait until the tone ceases and then make the announcement in the manner described above.

It may also be noted that relay AO in operating extends ground through make contact 165, break contact 171, to battery of relay RR to cause it to operate. Relay RR in operating removes ground from conductor 112 at break contact 113 to prevent any of the message selectors from being seized by the scanner-selector switch 240.

*Emergency Announcement*

On an emergency announcement immediate access to the system is provided and any announcement in the process of being made is discontinued, held by the message selector and then commenced from the start of the message after the emergency announcement is completed. To gain immediate access the operator holds pushbutton 117 depressed to extend ground to operate relay EAR which, in operating, extends the microphone 116 through make contacts 189 and 191 to the main amplifier; removes the holding ground on relays SS and EAS at break contact 119 causing them to restore; at make contact 119 extends the ground to operate relays ER and RS; and at make contact 122 closes ground to hold relay AO operated in order to keep the main amplifiers energized. When relay RS operates the relays of the scanner controller automatically restore in the manner previously described, however, no ground pulse is extended to operate relay E of message selector 250 to cause it to release the stored information; thus the information is held during the emergency announcement. This is true since the ground normally extended to operate relay E when relay RS operates is removed at break-make contacts 119 when relay EAR operated. The operator transmits his emergency announcement by means of microphone 116, the output of which is extended through make contacts 189 and 191 to the main amplifiers and loudspeakers of the system.

On the completion of the emergency announcement the operator releases pushbutton 117 causing ground to be removed from relay EAR which then restores. Relay ER is a slow-to-release relay and is provided to allow relay RS to restore before it restores. If relay RS did not restore prior to relay ER restoring it may be observed that ground would be extended through break contacts 119 and 118, conductors 108, 106 and 104, make contact 123 (if relay RS has not yet restored), to wiper 209 and bank contact 1 of scanner-selector switch 240, to battery of relay E to cause it to operate and release the stored information. Once relay RS and relay ER both restore relays ST, SS and EAS are again operated in the manner previously described and the sequence of operation is again commenced to transmit the prior announcement which had been interrupted.

*Power Failure*

During a power loss in the switching arrangement the operator sets selector switch 103 to connect telephone substation 101 to telephone line 109, removes the handset, and dials "0" as he does when making a general paging announcement. As previously described, the terminals of conductors 157 are seized and ground is extended from the control lead of the ground-forwarding selector to conductor 146 to operate relay AO energizing the main amplifiers which have a power supply independent of the switching arrangement. A power loss to the switching arrangement therefore has no effect on the main amplifiers and it is only necessary for the operator to proceed as when making a general paging announcement.

What is claimed is:

1. An announcing system wherein the announcements are contained in a plurality of recording elements, said system comprising: a plurality of stations; signalling means at each of said stations operative to transmit signals representative of code digits; message selector means connected to said stations and comprising a plurality of digit registers, each for registering one of said code digits, and holding means operated in response to the operation of all of said digit registers for holding said digit registers operated independently of said signalling means; and decoder means connected to said message selector means and comprising a plurality of decoder switches having wipers and bank contacts, said bank contacts having a plurality of recording elements connected thereto, and having means for stepping said wipers for engaging said bank contacts, said last-mentioned means automatically operated in accordance with the setting of said plurality of digit registers for selecting the recording element corresponding to said registered code digits.

2. An announcing system as claimed in claim 1, wherein said decoder means further includes decoder switch access means operated in accordance with the setting of said digit registers in said message selector means for selecting one of said decoder switches.

3. An announcing system as claimed in claim 1, including circuit connections extending from said digit registers to the wipers on corresponding levels of said decoder switches for activating a selected recording element which is connected to the last-mentioned level of one of said decoder switches.

4. An announcing system as claimed in claim 3, said system further comprising a decoder stopping arrangement including test relay means having a first and a second winding, circuit connections including said first and said second winding, said wipers and bank contacts on at least two of said levels of said decoder switches, and said wipers and bank contacts on at least one of said levels of one at least of said digit registers in series, whereby said test relay means is operated over said series circuit connections only in response to the coincident setting of the wipers of all of said above-mentioned switches to stop the stepping of said decoder switches to select one of said recording elements.

5. An announcing system wherein individual phrases are separately prerecorded in a plurality of recording elements and complete messages are formed by activating said recording elements to synthesize said individual phrases, said system comprising: a plurality of stations; means at each of said stations operative to transmit signals representative of code digits; message selector means operated in response to the receipt of said transmitted signals for registering said code digits; decoder means connected to said message selector means operated in response to the code digits registered in said message selector means for selecting one of said recording elements in accordance with said registered code digits; and control means connected to said message selector means operative to sequentially activate the different ones of said plurality of recording elements to synthesize said individual phrases to form a complete message in accordance with the setting of said message selector means as determined by the code digits registered therein.

6. An announcing system as claimed in claim 5 wherein there are provided identifying means having a plurality of recording elements connected directly thereto, said identifying means being operated under control of said control means during said sequence of operation to automatically include said recording element corresponding to the message selector requesting service.

7. An announcing system as claimed in claim 6 wherein one or more of said recording elements are connected to said digit registers and are directly selected by said digit registers in accordance with the code digits registered therein, one or more others of said recording elements being selected through the medium of said decoder means in accordance with the code digits registered in said digit registers.

8. An announcing system wherein individual phrases are separately prerecorded in a plurality of recording elements and complete messages are formed by activating said recording elements to synthesize said individual phrases, said system comprising: a plurality of stations; pulsing means at each of said stations operative to transmit code digits in the form of digital impulses; message selector means individual to each of said stations, said message selector means operated in response to the receipt of said digital impulses for registering the code digit thereof; decoder means connected to said message selector means operated in response to the registered code digits in said message selector means for selecting one of said recording elements in accordance with said registered code digits; and control means connected to said message selector means operative to sequentially activate the different ones of said plurality of recording elements to synthesize said individual phrases to form a complete message in accordance with the setting of said message selector means as determined by the code digits registered therein.

9. An announcing system wherein individual phrases are separately prerecorded in a plurality of recording elements and complete messages are formed by activating said recording elements to synthesize said individual phrases, said system comprising: a plurality of stations; pulsing means at each of said stations operative to transmit code digits in the form of digital impulses; message selector means individual to each of said stations, said message selector means operated in response to the receipt of said digital impulses for registering the code digits thereof; decoder means common to all of said message selector means operated in response to the registered code digits in said message selector means for selecting one of said recording elements in accordance with said registered code digits; and control means common to all of said message selector means operative to automatically select individual ones of said message selector means and to sequentially activate the different ones of said plurality of recording elements to synthesize said individual phrases to form a complete message in accordance with the setting of said selected message selector means as determined by the registered code digits thereon.

10. An announcing system as claimed in claim 9, said system further comprising amplifiers for amplifying the announcements synthesized from said individual phrases and emergency announcing apparatus having transmitter means, actuating means, relay means connected to said actuating means and operated in response to the operation of said actuating means for connecting said transmitter means to said amplifiers, and for terminating any message in the process of being announced, means in said control means connected to said relay means operated in response to the operation of said relay means for activating said amplifiers if said amplifiers have not been activated and for holding said amplifiers activated if said amplifiers are activated, and further means connected to said relay means operated in response to the operation of said relay means for causing said control means to lock-on said message selector, if an announcement is in progress, and thereby store said announcement until after said actuating means is restored whereby an emergency announcement is given priority over any other announcement in progress and said interrupted announcement is stored and repeated after completion of said emergency announcement.

11. An announcing system as claimed in claim 9, said system further comprising amplifiers for amplifying the announcements synthesized from said individual phrases, a telephone office having telephone switching means and telephone lines connected thereto, and general paging apparatus including switch means operative to connect said pulsing means to one of said telephone lines, said telephone switching means operated in response to said pulsing means transmitting a predetermined code digit for establishing a connection with a second telephone line extending from said telephone office to said announcing system; and comprising relay means in said control means connected to said second telephone line operated in response to said telephone switching means seizing said second telephone line for activating said amplifiers; and comprising conductor means in said control means connected to said second telephone line for extending said second telephone line to said amplifiers whereby said announcing system is operable independent of said recording elements to thereby allow general paging announcements to be made in addition to the messages derived from said recording elements.

12. An announcing system as claimed in claim 9, wherein said message selector means comprises a plurality of digit register means operated in response to said pulsing means for registering, individually, one of said code digits; and wherein said decoder means is connected to predetermined ones of said digit register means and operated in response to the registered code digits in said predetermined ones of said digit register means for selecting one or more of said recording elements in accordance with said registered code digits.

13. An announcing system as claimed in claim 12, wherein said message selector means includes holding means operated in response to the operation of all of said digit register means for holding said digit register means operated independently of said pulsing means.

14. An announcing system as claimed in claim 13, wherein said control means includes sequence control means operative to sequentially activate under the control of signals received from said recording elements the different ones of said plurality of recording elements in a predetermined order, for reproducing the complete message responsive to the setting of the selected message selector means as determined by the registered code digits thereon.

15. An announcing system as claimed in claim 14, wherein said control means includes allotter means, said allotter means marked by said holding means to indicate the condition of said message selector means and operated in response to said message selector means for automatically selecting individual ones of said message selector mean in accordance with said markings.

16. An announcing system wherein individual phrases are separately pre-recorded in a plurality of recording elements and complete messages are formed by activating said recording elements to synthesize said individual phrases, said system comprising: a plurality of stations; pulsing means at each of said stations operative to transmit code digits in the form of digital impulses; message selector means individual to each of said stations operated in response to the receipt of said digital impulses for registering the code digits thereof; decoder means common to all of said message selector means, said decoder means comprising a plurality of decoder switches operated in response to the registered code digits in said message selector means for automatically selecting one or more of said recording elements in accordance with said registered code digits; and control means common to all of said message selector means operative to sequentially activate the different ones of said plurality of recording elements to synthesize said individual phrases to form a complete message in accordance with the setting of said message selector means as determined by the registered code digits thereon.

17. An announcing system as claimed in claim 16, wherein said decoder means includes decoder switch access means operated in response to the registered code digits in said message selector means for selecting a predetermined one of said plurality of decoder switches.

18. An announcing system as claimed in claim 17, wherein said message selector means comprises a plurality of digit registers each having one or more levels of bank contacts, said bank contacts of at least one of said levels of predetermined ones of said digit registers being multiplied to form two groups of bank contacts, each group having a predetermined number of bank contacts therein, movably mounted wipers on each of said levels for engaging said bank contacts, and means for stepping said wipers in response to said digital impulses for selectively engaging one of said bank contacts; and wherein said decoder switch access means are connected individually to predetermined ones of said groups of bank contacts and operated in response to the registration of a code digit in one of said groups for selecting the corresponding one of said decoder switches.

19. An announcing system as claimed in claim 18, wherein each of said decoder switches has a plurality of levels of bank contacts, movably mounted wipers on each of said levels for engaging said bank contacts, and means for stepping said wipers for engaging said bank contacts, the stepping means of said selected decoder switch being operated in response to the operation of said predetermined decoder switch access means for causing the stepping means of said switch to automatically step said wipers.

20. An announcing system as claimed in claim 19, said system further comprising a decoder stopping arrangement including test relay means having a first and a second winding, circuit connections including said first and said second winding, said wipers and bank contacts on at least two of said levels of said decoder switches, and said wipers and bank contacts on at least one of said levels of at least one of said digit registers in series, whereby said test relay means is operated over said series circuit connections only in response to the coincident setting of the wipers of all of said above-mentioned switches to stop the stepping of said decoder switches to select one of said recording elements.

21. An announcing system as claimed in claim 20, wherein said control means comprises an allotter switch having a plurality of levels of bank contacts, corresponding ones of said contacts on each of said levels being associated with one of said message selector means, movably mounted wipers on each of said levels for engaging said bank contacts, and means for stepping said wipers for selectively engaging said bank contacts, said last-mentioned means operated in response to the operation of said message selector means to automatically step said wipers for allotting one of said message selector means requesting service; and wherein said wipers and bank contacts on at least two of said levels of bank contacts on said allotter switch is included in said series circuit connections.

22. An announcing system as claimed in claim 21, wherein said decoder means includes circuit connections extending from individual ones of said bank contacts on one of said levels of one of said digit registers to the wipers on corresponding levels of said selected decoder switch for activating the particular one only of said selected recording elements which is connected to the last-mentioned level.

References Cited in the file of this patent

UNITED STATES PATENTS

| | | |
|---|---|---|
| Re. 24,170 | Lee | June 26, 1956 |
| 1,732,184 | Bellamy et al. | Oct. 15, 1929 |
| 1,993,870 | Bellineau | Mar. 12, 1935 |
| 2,554,115 | Molnar | May 22, 1951 |
| 2,684,406 | Lomax et al. | July 20, 1954 |
| 2,695,928 | Joel | Nov. 30, 1954 |
| 2,773,127 | Coleman | Dec. 4, 1956 |
| 2,776,341 | Peterson | Jan. 1, 1957 |
| 2,832,841 | Eldridge | Apr. 29, 1958 |
| 2,899,502 | Vonhof | Aug. 11, 1959 |